US012481336B2

(12) United States Patent
    Takaoka

(10) Patent No.: US 12,481,336 B2
(45) Date of Patent: Nov. 25, 2025

(54) ELECTRONIC DEVICE

(71) Applicant: Panasonic Intellectual Property Management Co., Ltd., Osaka (JP)

(72) Inventor: Hiroyuki Takaoka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 201 days.

(21) Appl. No.: 18/235,830

(22) Filed: Aug. 19, 2023

(65) Prior Publication Data
    US 2023/0393636 A1    Dec. 7, 2023

Related U.S. Application Data

(63) Continuation of application No. PCT/JP2021/042681, filed on Nov. 19, 2021.

(30) Foreign Application Priority Data
    Feb. 26, 2021   (JP) .................. 2021-029445

(51) Int. Cl.
    *G06F 1/16*     (2006.01)
    *G06F 1/20*     (2006.01)
    (Continued)

(52) U.S. Cl.
    CPC ......... G06F 1/203 (2013.01); H05K 7/20145 (2013.01); H05K 7/20409 (2013.01)

(58) Field of Classification Search
    CPC ....... G06F 1/20; G06F 1/206; H05K 7/20145; H05K 7/2049; H05K 7/20136;
    (Continued)

(56) References Cited

U.S. PATENT DOCUMENTS 6,311,767 B1 * 11/2001 Inoue .................. F28F 1/12
                                                165/80.4
6,671,177 B1 * 12/2003 Han .................. H01L 23/467
                                                257/722
(Continued)

FOREIGN PATENT DOCUMENTS

JP    2005-175246 A    6/2005
JP    2010-026522 A    2/2010
(Continued)

OTHER PUBLICATIONS

The EPC Office Action dated Jul. 31, 2024 for the related European Patent Application No. 21928051.8.
(Continued)

*Primary Examiner* — Anthony M Haughton
(74) *Attorney, Agent, or Firm* — Renner, Otto, Boisselle & Sklar, LLP

(57)    ABSTRACT

An electronic device includes: a housing having an exhaust surface including an exhaust port; a blower that is arranged inside the housing and sends air from an inside of the housing to an outside of the housing via the exhaust port; an exhaust portion arranged inside the housing and having an exhaust path for guiding the air sent from the blower toward the exhaust port along an air blowing direction intersecting the exhaust surface; and a fin arranged in the exhaust path and having a plurality of plate members. Each of the plurality of plate members is arranged along the air blowing direction.

7 Claims, 3 Drawing Sheets

(51) Int. Cl.
*H05K 5/00* (2025.01)
*H05K 7/00* (2006.01)
*H05K 7/20* (2006.01)

(58) Field of Classification Search
CPC ........... H05K 7/20172; H05K 7/20181; H05K 7/20154; H05K 7/20163
See application file for complete search history.

(56) References Cited

U.S. PATENT DOCUMENTS

| | | | |
|---|---|---|---|
| 7,165,601 B1 | | 1/2007 | Hashimoto |
| 9,939,860 B2 * | | 4/2018 | Zhang ................. H02J 4/00 |
| 2004/0114328 A1 * | | 6/2004 | Chiou ................. G06F 1/203 |
| | | | 415/214.1 |
| 2004/0182552 A1 * | | 9/2004 | Kubo ................. H01L 23/3672 |
| | | | 257/E23.103 |
| 2006/0034055 A1 | | 2/2006 | Mok |
| 2007/0084584 A1 | | 4/2007 | Hashimoto |
| 2012/0050991 A1 | | 3/2012 | Tamanuki |
| 2012/0229983 A1 | | 9/2012 | Nakajima |
| 2013/0223007 A1 * | | 8/2013 | Nakajima ......... H05K 7/20336 |
| | | | 361/697 |
| 2015/0062805 A1 | | 3/2015 | Katsumata |

FOREIGN PATENT DOCUMENTS

| | | |
|---|---|---|
| JP | 2012-049315 A | 3/2012 |
| JP | 2012-191504 A | 10/2012 |
| JP | 2014-085973 A | 5/2014 |
| JP | 2015-053330 A | 3/2015 |
| JP | 2017-055271 A | 3/2017 |

OTHER PUBLICATIONS

International Search Report for corresponding Application No. PCT/JP2021/042681, mailed Jan. 11, 2022.

* cited by examiner

ELECTRONIC DEVICE

TECHNICAL FIELD

The present disclosure relates to an electronic device.

BACKGROUND ART

PTL 1 discloses a mobile information device including a heat dissipation device having a heat sink and a fan for blowing air to the heat sink. In the mobile information device of PTL 1, the heat sink has a large number of plate-shaped fins each inclined with respect to a normal line of a side wall of a housing of the heat dissipation device.

CITATION LIST

Patent Literature

PTL 1: Unexamined Japanese Patent Publication No. 2014-085973

SUMMARY OF THE INVENTION

The mobile information device of PTL 1 has room for improvement in terms of improving the air volume of the fan.

An object of the present disclosure is to provide an electronic device capable of improving the amount of air sent from a blower to the outside of a housing while guiding the air sent from the blower along an air blowing direction intersecting an exhaust surface.

An electronic device according to one aspect of the present disclosure includes:
  a housing having an exhaust surface including an exhaust port;
  a blower that is arranged inside the housing and sends air from an inside of the housing to an outside of the housing via the exhaust port;
  an exhaust portion arranged inside the housing and having an exhaust path for guiding the air sent from the blower toward the exhaust port along an air blowing direction intersecting the exhaust surface; and
  a fin arranged in the exhaust path and having a plurality of plate members. Each of the plurality of plate members is arranged along the air blowing direction.

According to the present disclosure, it is possible to provide the electronic device capable of improving the amount of air sent from the blower to the outside of the housing while guiding the air sent from the blower along the air blowing direction intersecting the exhaust surface.

DESCRIPTION OF EMBODIMENT

Background to Present Disclosure

Figure 1:
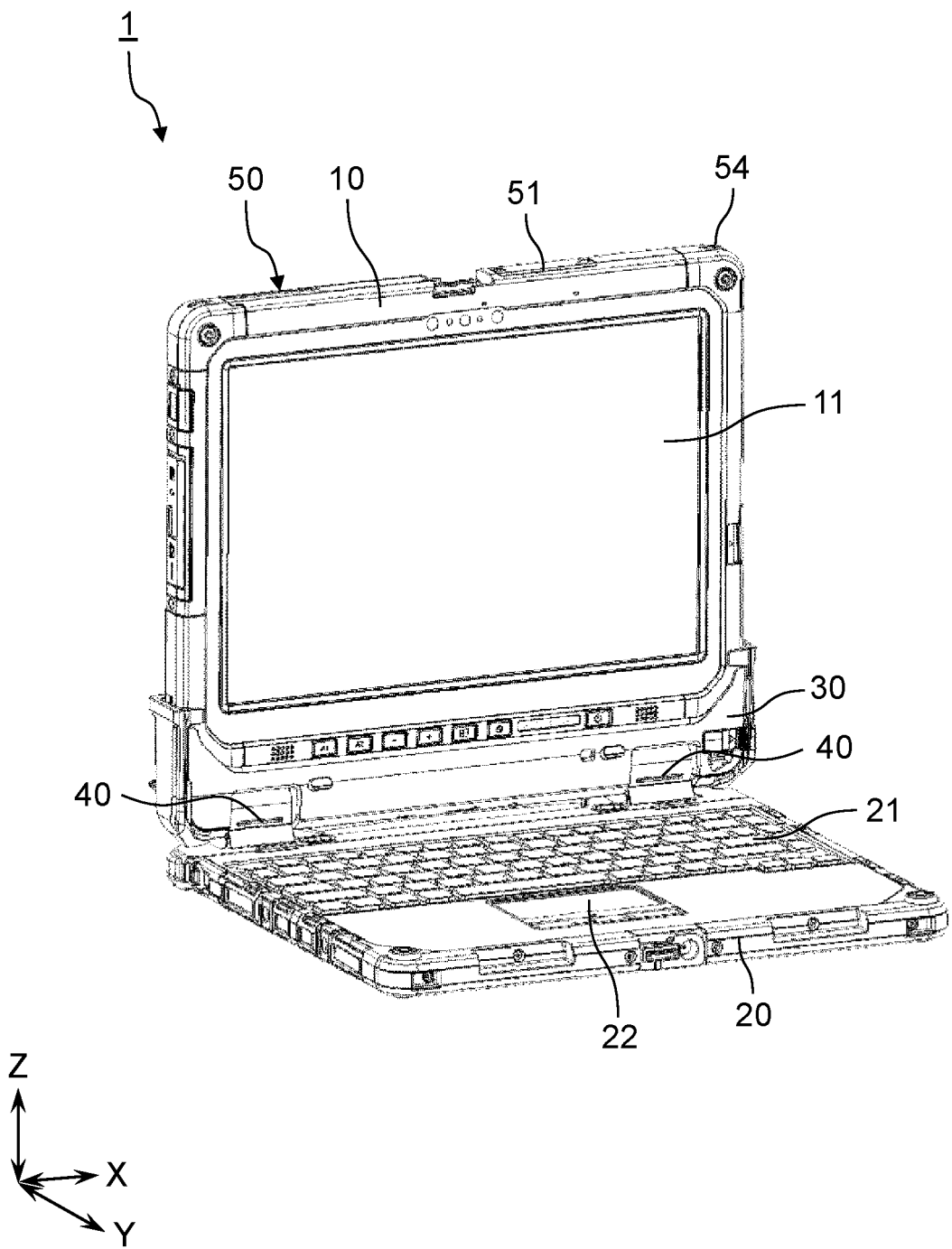
FIG. 1 is a perspective view illustrating an electronic device according to an exemplary embodiment of the present disclosure.

In the mobile information device of PTL 1, the exhaust direction of hot air exhausted from the inside to the outside of the housing is determined by the inclination angle of the fin with respect to the normal line of the side surface of the housing of the heat dissipation device. That is, in the mobile information device of PTL 1, since the air sent from the fan collides with the fins, it may be difficult to improve the amount of air blown from the fan.

The present inventors have devised an electronic device that improves the amount of air sent from a blower to the outside of a housing while guiding the air sent from the blower along an air blowing direction intersecting an exhaust surface, and have reached the following present invention.

An electronic device according to a first aspect of the present disclosure includes:
  a housing having an exhaust surface provided with an exhaust port;
  a blower that is arranged inside the housing and sends air from an inside of the housing to an outside of the housing via the exhaust port;
  an exhaust portion provided inside the housing and having an exhaust path for guiding the air sent from the blower toward the exhaust port along an air blowing direction intersecting the exhaust surface; and
  a fin that is arranged in the exhaust path and includes a plurality of plate members arranged such that plate surfaces intersecting each other in a thickness direction face each other, the plate surfaces of the plurality of plate members being arranged along the air blowing direction.

According to the electronic device according to the first aspect, the fin is provided in the exhaust path and includes the plurality of plate members arranged such that the plate surfaces intersecting each other in the thickness direction face each other, and the plate surfaces of the plurality of plate members are arranged along the air blowing direction. With such a configuration, it is possible to suppress a reduction in air volume caused by the air sent from the blower passing through the fin. As a result, it is possible to achieve the electronic device that improves the amount of air sent from the blower to the outside of the housing while guiding the air sent from the blower along the air blowing direction intersecting the exhaust surface.

An electronic device according to a second aspect of the present disclosure includes a heat pipe extending along an arrangement direction of the plurality of plate members, and the heat pipe includes:
  a pipe body to which the fin is connected; and
  a distal end provided at one end of the pipe body in an arrangement direction of the plurality of plate members and arranged in a first region adjacent to the fin in the arrangement direction.

Usually, there is a region that does not function as a heat transport element at the tip of the heat pipe. According to the electronic device according to the second aspect, since the fin is connected to the pipe body instead of the distal end, the heat transported by the heat pipe can be efficiently transferred to the fin. In addition, the distal end is arranged in the first region adjacent to the fin in the arrangement direction of the plurality of plate members. With such a configuration, it is possible to achieve space saving inside the electronic device while maintaining the heat dissipation effect of the electronic device.

An electronic device according to a third aspect of the present disclosure includes a structure arranged inside the housing, and the structure is arranged in a second region adjacent to the fin in the arrangement direction.

According to the electronic device according to the third aspect, the structure is arranged in the second region adjacent to the fin in the arrangement direction of the plurality of plate members. With such a configuration, it is possible to achieve space saving inside the electronic device while maintaining the heat dissipation effect of the electronic device.

In an electronic device according to a fourth aspect of the present disclosure, the housing includes a corner which is formed by the exhaust surface and an intersection surface intersecting the exhaust surface, and in which the blower and the exhaust portion are arranged, the structure is a protection member that protects the corner, the blower, the exhaust portion, and the fin are arranged at the corner, the exhaust path extends in a direction in which the exhaust surface extends and in a direction away from the intersection surface as approaching the exhaust surface along a direction in which the intersection surface extends, and the second region is surrounded by the exhaust surface, the intersection surface, and the fin.

According to the electronic device according to the fourth aspect, the protection member is arranged in the second region adjacent to the fin in the arrangement direction of the plurality of plate members and surrounded by the exhaust surface, the intersection surface, and the fin. With such a configuration, it is possible to achieve space saving inside the electronic device while maintaining the heat dissipation effect of the electronic device.

Hereinafter, an exemplary embodiment of the present disclosure will be described with reference to the drawings. Note that, in the drawings, the same components are denoted by the same reference numerals, and description thereof will be omitted as appropriate. Further, the exemplary embodiment is not intended to limit the present disclosure, but is an example, and can be appropriately changed without departing from the gist of the present disclosure.

EXEMPLARY EMBODIMENT

As an example, as illustrated in FIG. 1, electronic device 1 according to the present exemplary embodiment is a notebook type personal computer (in other words, a laptop PC). Electronic device 1 includes first unit 10 and second unit 20. First unit 10 is detachably attached to second unit 20. That is, electronic device 1 is configured as a so-called detachable computer.

First unit 10 is a tablet computer having display 11. Display 11 is, for example, a liquid crystal display panel and includes a touch panel capable of receiving a user's touch operation. First unit 10 incorporates a central processing unit (CPU), a volatile storage (RAM), a nonvolatile storage (ROM, SSD, or the like), a battery, and the like. The nonvolatile storage (ROM, SSD, or the like) stores an operating system (OS), various application programs, various data, and the like. The central processing unit (CPU) executes arithmetic processing by reading the OS, the application programs, and the various data, thereby achieving various functions.

Second unit 20 is a station to which first unit 10 is detachably attached. Second unit 20 includes input units 21, 22, socket 30, and hinges 40. Input units 21, 22 include, for example, a keyboard and a touch pad, and are configured such that a user can perform input processing.

Socket 30 detachably houses first unit 10. Socket 30 is arranged at one end in a depth direction of second unit 20 (for example, the Y direction), and is connected to second unit 20 via hinges 40.

Hinge 40 has a rotation shaft extending along a width direction of electronic device 1 (for example, the X direction), and socket 30 can be held at any angle with respect to second unit 20 by rotating socket 30 about the rotation shaft. For example, as illustrated in FIG. 1, by holding socket 30 at an angle of approximately 90 degrees with respect to second unit 20 by hinges 40, first unit 10 is brought into an open state at an angle of approximately 90 degrees with respect to second unit 20. In addition, first unit 10 can be brought into a closed state by being held at an angle of substantially 0 degrees with respect to second unit 20 by hinges 40. The "closed state" is a state in which first unit 10 and second unit 20 face each other closely and are substantially parallel to each other.

Figure 2:
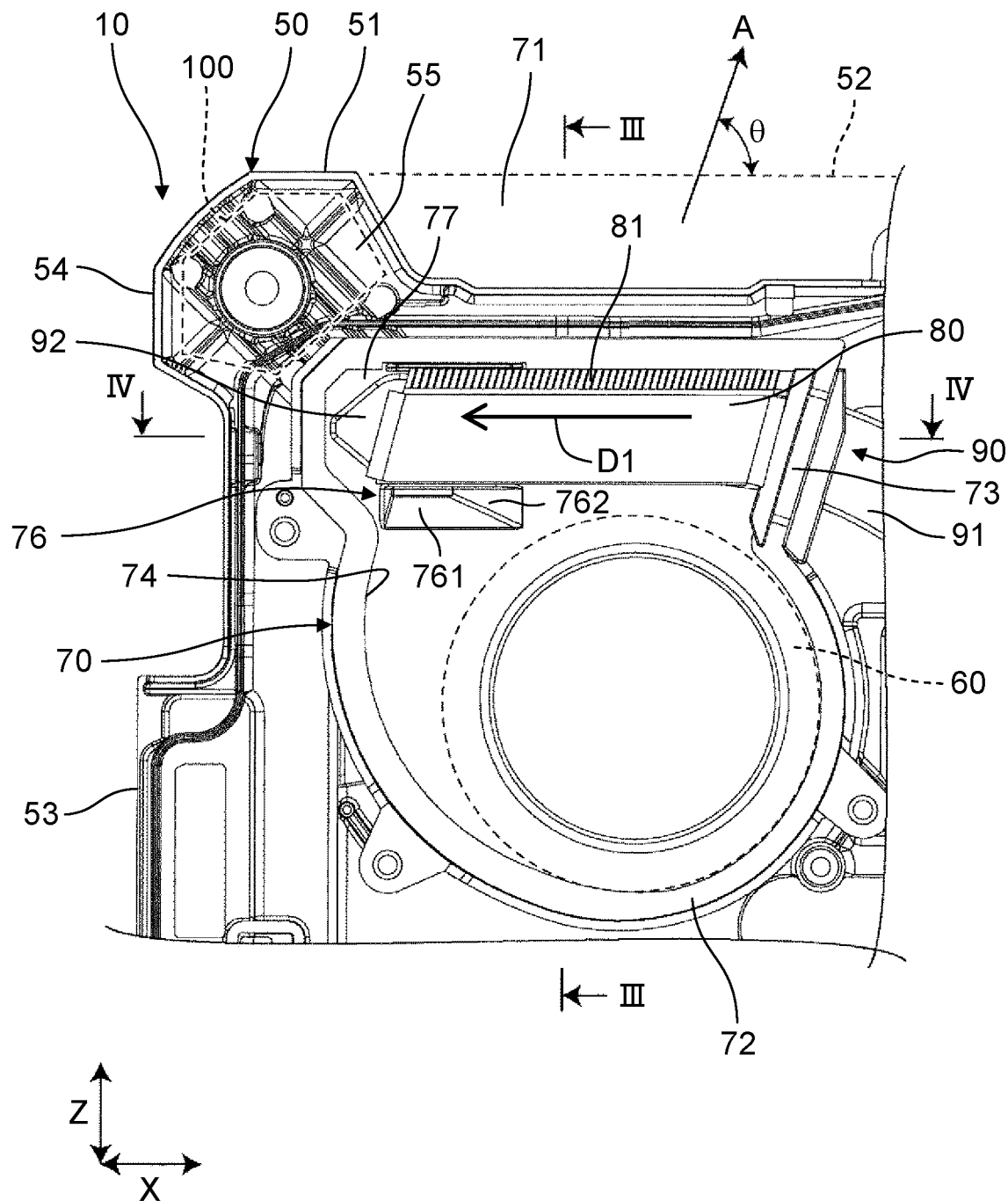
FIG. 2 is a rear view illustrating a corner of a first unit in the electronic device of FIG. 1.
Figure 3:
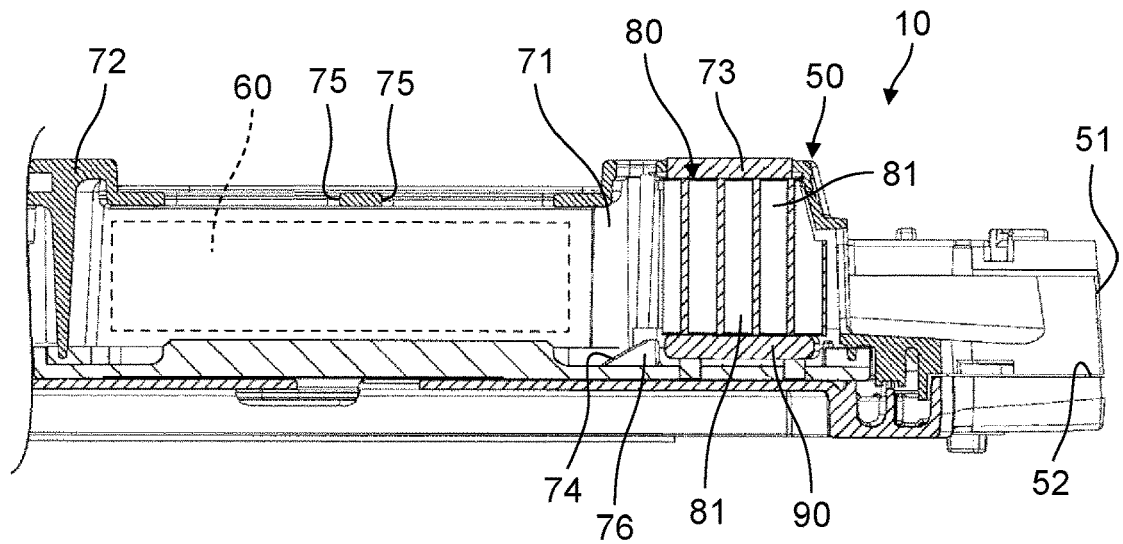
FIG. 3 is a cross-sectional view taken along line III-III of FIG. 2.
Figure 4:
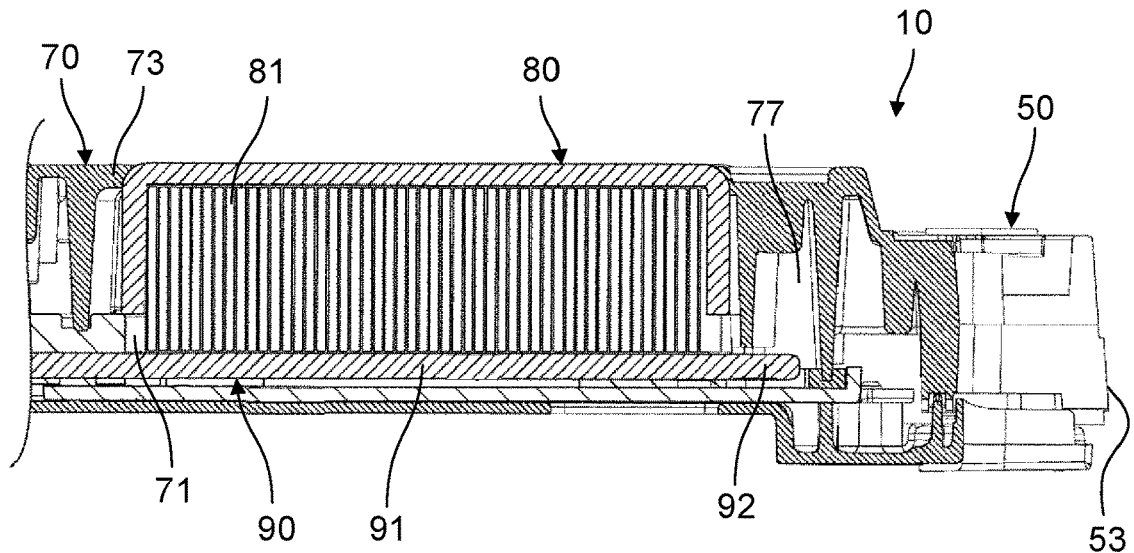
FIG. 4 is a cross-sectional view taken along line IV-IV of FIG. 2.

Next, a configuration of first unit 10 will be described. In FIGS. 2 to 4, a part of components constituting first unit 10 is omitted.

As illustrated in FIG. 2, first unit 10 includes housing 50 having exhaust surface 51, blower 60 arranged inside housing 50, exhaust portion 70 arranged inside housing 50 and having exhaust path 71, and fin 80 arranged in exhaust path 71. In the present exemplary embodiment, first unit 10 further includes heat pipe 90 and structure 100.

As an example, housing 50 has a substantially rectangular plate shape and is configured to be capable of housing electronic components therein. Exhaust surface 51 constitutes one of side surfaces extending in a thickness direction of housing 50 (for example, the Y direction). In the present exemplary embodiment, as illustrated in FIG. 2, exhaust surface 51 extends in a width direction of first unit 10. Exhaust surface 51 is provided with exhaust port 52 for discharging air sent from blower 60 to the outside of housing 50.

Housing 50 has corner 54 constituted by exhaust surface 51 and intersection surface 53 intersecting exhaust surface 51. Intersection surface 53 extends along a height direction of housing 50 (for example, the Z direction). In the present exemplary embodiment, blower 60, exhaust portion 70, and fin 80 are arranged at corner 54 of housing 50.

Blower 60 is configured by, for example, a sirocco fan, and sends air from the inside of housing 50 to the outside of housing 50 via exhaust port 52. In the present exemplary embodiment, blower 60 is arranged inside exhaust portion 70 as illustrated in FIG. 2. Blower 60 is not limited to the sirocco fan, and can be configured by, for example, a fan other than the axial fan.

As illustrated in FIG. 2, exhaust portion 70 includes exhaust path 71 that guides air sent from blower 60 toward exhaust port 52 along an air blowing direction (for example, the arrow A direction in FIG. 2) intersecting exhaust surface 51. The air blowing direction forms an angle $\theta$ (for example, $\theta$=about 70 degrees) with respect to exhaust surface 51 when viewed along the thickness direction of housing 50. Note that the angle $\theta$ may be in the range of 65 degrees to 75 degrees. In the present exemplary embodiment, as illustrated in FIGS. 2 and 3, exhaust portion 70 has a box shape configured by curved portion 72 and linear portion 73, and exhaust path 71 is formed inside. Exhaust path 71 extends in a direction in which exhaust surface 51 extends and in a direction away from intersection surface 53 as approaching exhaust surface 51 along a direction in which intersection surface 53 extends.

As illustrated in FIG. 2, curved portion 72 has opening 74 facing exhaust surface 51, and blower 60 is arranged inside curved portion 72. As illustrated in FIG. 3, curved portion 72 has air suction port 75 provided on one surface of housing 50 in the thickness direction. Air is supplied to blower 60 through air suction port 75.

As illustrated in FIG. 2, linear portion 73 extends from opening 74 of curved portion 72 along the air blowing direction. As illustrated in FIG. 3, heat pipe 90 and fin 80 connected to heat pipe 90 are arranged inside linear portion 73. linear portion 73 has projection 76 that is provided at an end close to curved portion 72 in the air blowing direction inside linear portion 73 and positions heat pipe 90. Projection 76 is provided on an inner surface of linear portion 73 facing air suction port 75 of curved portion 72 in the thickness direction of housing 50 and at an end closer to intersection surface 53 in a width direction of housing 50. Projection 76 is provided with two inclined surfaces 761, 762. Inclined surface 761 is inclined in a direction approaching air suction port 75 in the thickness direction of housing 50 as approaching an attachment surface in the height direction of housing 50. Inclined surface 762 is inclined in a direction approaching air suction port 75 in the thickness direction of housing 50 as approaching intersection surface 53 in the width direction of housing 50.

Fin 80 includes a plurality of plate members 81. The plurality of plate members 81 are arranged at intervals in the width direction of housing 50 such that plate surfaces intersecting each other in the thickness direction of plate members 81 face each other. The plate surface of each plate member 81 is arranged along the air blowing direction (in other words, substantially parallel to the air blowing direction).

As illustrated in FIG. 2, heat pipe 90 extends along the width direction of housing 50 (in other words, arrangement direction D1 of the plurality of plate members 81). Heat pipe 90 includes pipe body 91 and distal end 92 provided at one end of pipe body 91 in the width direction of housing 50. In the present exemplary embodiment, as illustrated in FIG. 3, pipe body 91 has a plate shape with a rectangular cross section, and fin 80 is connected to one surface in the thickness direction. As illustrated in FIG. 4, exhaust path 71 inside linear portion 73 is substantially entirely covered with fin 80 and pipe body 91.

First region 77 in which distal end 92 is arranged is provided at an end in the width direction of housing 50 and closer to intersection surface 53 inside linear portion 73. First region 77 is arranged closer to intersection surface 53 than fin 80 in the width direction of housing 50 so as to be adjacent to intersection surface 53, and is surrounded by linear portion 73 and fin 80. As illustrated in FIG. 2, first region 77 is a region that does not overlap fin 80 when viewed along the thickness direction of housing 50 (for example, the Y direction).

As an example, structure 100 is a protection member that protects corner 54 of housing 50. Protection member 100 is arranged in second region 55 adjacent to the plurality of plate members 81 in the arrangement direction thereof and surrounded by exhaust surface 51, intersection surface 53, and fin 80.

Electronic device 1 can exhibit the following effects.

According to electronic device 1, fin 80 is provided in exhaust path 71 and includes the plurality of plate members 81 arranged such that plate surfaces intersecting each other in the thickness direction face each other, and the plate surfaces of the plurality of plate members 81 are arranged along the air blowing direction. With such a configuration, it is possible to suppress a reduction in air volume caused by air sent from blower 60 passing through fin 80. As a result, it is possible to achieve electronic device 1 that improves an amount of air sent from blower 60 to the outside of housing 50 while guiding the air sent from blower 60 along the air blowing direction intersecting exhaust surface 51.

Usually, there is a region that does not function as a heat transport element at the distal end of heat pipe 90. According to electronic device 1, since fin 80 is connected to pipe body 91 instead of distal end 92 of heat pipe 90, the heat transported by heat pipe 90 can be efficiently transferred to fin 80. In addition, distal end 92 is arranged in first region 77 adjacent to fin 80 in the arrangement direction of the plurality of plate members 81. In other words, by arranging plate members 81 of fin 80 along the air blowing direction, distal end 92 of heat pipe 90 is arranged in first region 77 which is a space formed between linear portion 73 of exhaust portion 70 and fin 80. With such a configuration, it is possible to achieve space saving inside electronic device 1 while maintaining the heat dissipation effect of electronic device 1.

Structure 100 is arranged in second region 55 adjacent to fin 80 in the arrangement direction of the plurality of plate members 81. With such a configuration, it is possible to achieve space saving inside electronic device 1 while maintaining the heat dissipation effect of electronic device 1.

Protection member 100 is arranged in second region 55 adjacent to fin 80 in the arrangement direction of the plurality of plate members 81 and surrounded by exhaust surface 51, intersection surface 53, and fin 80. In other words, protection member 100 is arranged in a space surrounded by exhaust surface 51, intersection surface 53, and fin 80 formed by arranging plate members 81 of fin 80 along the air blowing direction. With such a configuration, it is possible to achieve space saving inside electronic device 1 while maintaining the heat dissipation effect of electronic device 1.

Electronic device 1 can also be configured as follows.

Electronic device 1 may not include heat pipe 90 and structure 100. Blower 60, exhaust portion 70, and fin 80 may be arranged at positions away from corner 54 of housing 50. In this case, structure 100 is not limited to the protection member, and may be, for example, a camera.

Blower 60, exhaust portion 70, and fin 80 are not limited to being arranged at corner 54, and can be arranged at a corner or in the vicinity of the corner of any housing 50.

Exhaust portion 70 is not limited to the configuration including curved portion 72 and linear portion 73, and any configuration capable of forming exhaust path 71 therein can be adopted.

Exhaust path 71 is not limited to the case of extending in the direction in which exhaust surface 51 extends and in the direction away from intersection surface 53 as approaching exhaust surface 51 along the direction in which intersection surface 53 extends. Exhaust path 71 can also be configured to extend in the direction in which exhaust surface 51 extends and in the direction approaching intersection surface 53 as approaching exhaust surface 51 along the direction in which intersection surface 53 extends.

Fin 80 can adopt any configuration that includes the plurality of plate members 81 and can be arranged in exhaust path 71.

The present disclosure is also applicable to an electronic device in which blower 60, exhaust portion 70, and fin 80 are arranged inside a housing of second unit 20.

By appropriately combining discretionary exemplary embodiments or modifications among the various exemplary embodiments or modifications, it is possible to achieve the respective effects. Combination of exemplary embodiments, combination of examples, or combination of exemplary embodiments and examples are possible, and combination of features in different exemplary embodiments or examples are also possible.

Although the present disclosure has been described in connection with a preferable exemplary embodiment with reference to the accompanying drawings, various modifications and corrections are obvious to those skilled in the art. It is to be understood that such modifications and corrections are included within the scope of the present disclosure according to the appended claims unless such modifications and corrections depart from the scope of the present disclosure.

INDUSTRIAL APPLICABILITY

The present disclosure is widely applicable to electronic devices including notebook personal computers.

REFERENCE MARKS IN THE DRAWINGS 1 electronic device
10 first unit
11 display
20 second unit
21, 22 input unit
30 socket
40 hinge
50 housing
51 exhaust surface
52 exhaust port
53 intersection surface
54 corner
55 second region
60 blower
70 exhaust portion
71 exhaust path
72 curved portion
73 linear portion
74 opening
75 air suction port
76 projection
761, 762 inclined surface
77 first region
80 fin
81 plate member
90 heat pipe
91 pipe body
92 distal end
100 protection member

The invention claimed is:

1. An electronic device comprising:
a housing having an exhaust surface including an exhaust port and an intersection surface intersecting the exhaust surface, the exhaust surface and the intersection surface form a corner of the housing;
a blower that is arranged inside the housing and sends air from an inside of the housing to an outside of the housing via the exhaust port;
an exhaust portion arranged inside the housing and having an exhaust path for guiding the air sent from the blower toward the exhaust port along an air blowing direction intersecting the exhaust surface, the air blowing direction being inclined with respect to the intersection surface; and
a fin arranged in the exhaust path and having a plurality of plate members,
wherein each of the plurality of plate members is arranged along the air blowing direction.

2. The electronic device according to claim 1, further comprising a heat pipe extending along an arrangement direction of the plurality of plate members,
wherein the heat pipe includes:
a pipe body connected to the fin, and
a distal end provided at one end of the pipe body in the arrangement direction and arranged in a first region adjacent to the fin in the arrangement direction,
the exhaust portion includes a linear portion extending in the arrangement direction and having an end adjacent to the intersection surface in the arrangement direction, the linear portion inside of which the heat pipe and the fin are arranged,
the first region is a space formed between the end of the linear portion and the fin.

3. The electronic device according to claim 2, wherein the first region is a region that does not overlap the fin when viewed along a thickness direction of the housing.

4. The electronic device according to claim 1, further comprising a structure arranged inside the housing,
wherein the structure is arranged in a second region adjacent to the fin in the arrangement direction of the plurality of plate members.

5. The electronic device according to claim 4, wherein the structure is a protection member that protects the corner,
the blower, the exhaust portion, and the fin are arranged at the corner,
the exhaust path extends in a direction away from the intersection surface as approaching the exhaust surface along a direction in which the intersection surface extends, and
the second region is surrounded by the exhaust surface, the intersection surface, and the fin.

6. The electronic device according to claim 3, further comprising a structure arranged inside the housing,
wherein
the structure is arranged in a second region adjacent to the fin in the arrangement direction of the plurality of plate members,
the structure is a protection member that protects the corner,
the blower, the exhaust portion, and the fin are arranged at the corner,
the exhaust path extends in a direction away from the intersection surface as approaching the exhaust surface along a direction in which the intersection surface extends,
the second region is surrounded by the exhaust surface, the intersection surface, and the fin, and
the first region is located between the second region and the fin.

7. The electronic device according to claim 1, wherein an angle formed by the air blowing direction and the exhaust surface is in a range of 65 degrees to 75 degrees.

* * * * *